United States Patent Office 3,459,861
Patented Aug. 5, 1969

---

3,459,861
METHOD OF TREATING INFLUENZA VIRAL INFECTION
Robert Bruce Angier and Keith Chadwick Murdock, Pearl River, N.Y., and Joe Haller Clark, Woodcliff Lake, N.J., assignors to American Cyanamid Company, Stamford, Conn., a corporation of Maine
No Drawing. Continuation-in-part of application Ser. No. 575,260, Aug. 26, 1966. This application Mar. 19, 1968, Ser. No. 714,344
Int. Cl. A61k 27/00; C07d 39/00, 43/00
U.S. Cl. 424—263  8 Claims

ABSTRACT OF THE DISCLOSURE

This invention describes compositions of substituted azabicyclo-octane and azabicyclo-nonane compounds with pharmaceutically acceptable carriers. These compositions are useful in treating influenza viruses in warm-blooded animals.

---

This application is a continuation-in-part of our application Ser. No. 575,260, filed Aug. 26, 1966, now abandoned.

Summary of the invention

This invention relates to new compositions for, and methods of, treating influenza viral infections in warm-blooded animals.

More particularly, it has been found that compositions containing as the active component a compound of the following formula:

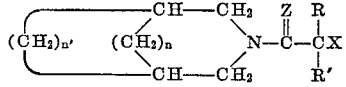

wherein R and R' are hydrogen or lower alkyl; Z is two hydrogen atoms or oxygen; X is an amino, lower alkyl amino, lower dialkylamino or a nitro group; $n$ is 1 or 2; and $n'$ is 2 or 3, are effective against influenza viral infections.

The invention includes within its scope the physiologically acceptable salts of the above described compounds, among which are the hydrochloride, sulfate, maleate and the like. The free bases and salts of the compounds of this invention are, in general, crystalline solids. The free bases are, in general, soluble in chloroform, ether, alcohols and the like and slightly to moderately soluble in water.

Among the compounds within the scope of the present invention as active components are 3-(2-aminoethyl)-3-azabicyclo[3.3.1]nonane;
3-glycyl-3-azabicyclo[3.2.2]nonane;
3-(2-methyl-2-nitropropyl)-3-azabicyclo[3.2.2]nonane;
3-(2-amino-2-methylpropyl)-3-azabicyclo[3.2.2]nonane;
3-glycyl-3-azabicyclo[3.3.1]nonane;
3-glycyl-3-azabicyclo[3.2.1]nonane;
3-(2-aminoethyl)-3-azabicyclo[3.2.2]nonane;
3-(2-methylaminoethyl)-3-azabicyclo[3.2.2]nonane;
3-(2-ethylaminoethyl)-3-azabicyclo[3.2.2]nonane;
3-(2-propylaminoethyl)-3-azabicyclo[3.2.1]octane;
3-(2-diethylaminoethyl)-3-azabicyclo[3.2.2]nonane;
3-(2-dipropylaminoethyl)-3-azabicyclo[3.2.1]octane, and
3-(2-aminoethyl)-3-azabicyclo[3.2.1]octane.

The compounds of the present invention may be prepared by one of the methods illustrated in the following flow chart and described more fully hereinafter in the examples.

Flow chart

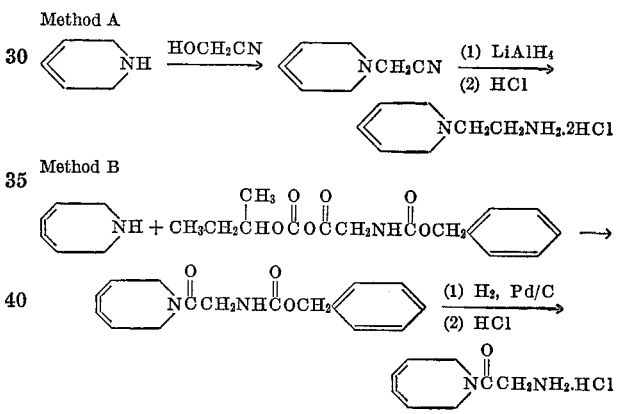

Method C

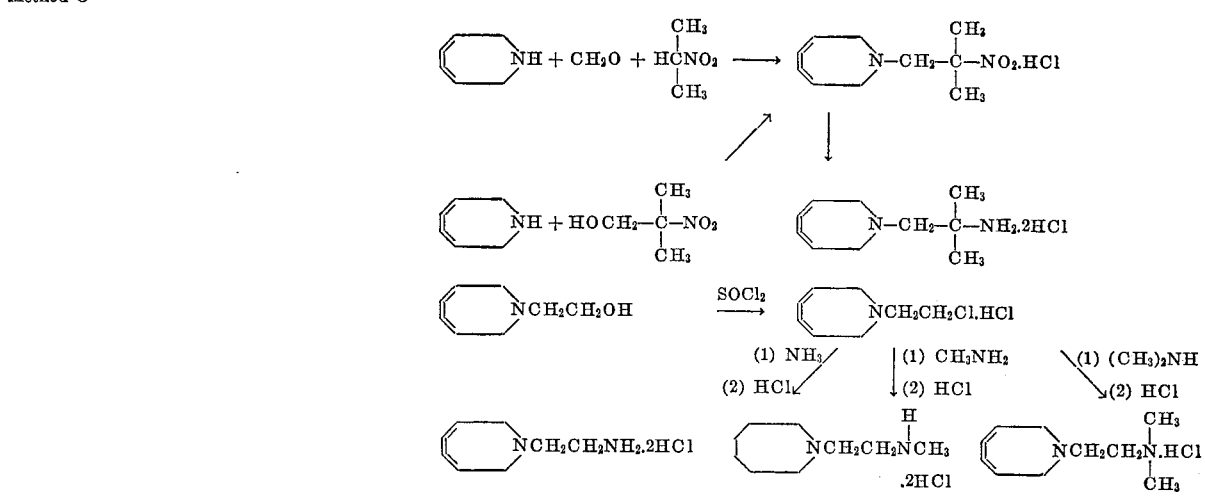

The activity of representative compounds of the present invention against influenza virus infections was determined by the following tests:

Test procedure 1

Infections were produced in groups of 20 white mice 16–20 grams body weight, by intranasal instillation of 0.05 ml. volumes of a $10^{-4.3}$ ($LD_{95}$) broth dilution of influenza A2–J–305–57. Test compounds as indicated in Table I were administered orally in the dosages described in Table I directly after infection. Results, expressed as mortality rates on the fourteenth day after infection, for infected, nontreated control groups and groups treated with the test compounds are summarized in Table I, immediately below:

TABLE I.—COMPOUNDS TESTED (SURVIVORS/TOTAL)[1]

| Dose, mg./kg.: | (A) | (B) | (C) | (D) | (E) | (F) | (G) |
|---|---|---|---|---|---|---|---|
| 800 |  | 19/20 | 8/20 |  |  | 16/20 |  |
| 400 |  | 17/20 | 9/20 | 19/20 |  | 6/20 | 13/20 |
| 200 | 11/20 | 15/20 | 4/20 | 7/20 | 11/20 | 3/20 | 8/20 |
| 100 | 12/20 | 9/20 | 3/20 | 1/20 | 8/20 |  | 1/20 |
| 50 | 9/20 | 0/20 |  |  | 4/20 |  |  |
| 25 | 6/20 |  |  |  |  |  |  |
| 12.5 | 0/20 |  |  |  |  |  |  |
| Controls | 0/20 | 0/20 | 0/20 | 2/20 | 1/20 | 2/20 | 1/20 |

[1] Survivors to total tested on 14th day after infection.
(A) 3-(2-amino-2-methylpropyl)-3-azabicyclo[3.2.2]nonane. 2HCl.
(B) 3-(2-aminoethyl)-3-azabicyclo[3.2.2]nonane. 2HCl.
(C) 3-glycyl-3-azabicyclo[3.2.2]nonanehydrochloride.
(D) 3-(2-methylaminoethyl)-3-azabicyclo[3.2.2]nonane. 2HCl.
(E) 3-(2-aminoethyl)-3-azabicyclo[3.3.1]nonane. 2HCl.
(F) 3-(2-methyl-2-nitropropyl)-3-azabicyclo[3.2.2]nonane.
(G) 3-(2-dimethylaminoethyl)-3-azabicyclo[3.2.2]nonane. 2HCl.
(single oral dose treatment).

test compounds are summarized in Table II, immediately below:

TABLE II.—COMPOUNDS TESTED (SURVIVORS/TOTAL)[1]

| Dose, mg./kg.: | (A) | (B) | (C) | (D) | (E) | (F) | (G) |
|---|---|---|---|---|---|---|---|
| 800 |  |  | 12/15 |  |  |  |  |
| 400 |  | 13/15 |  | 10/15 |  | 12/15 | 6/15 |
| 200 |  |  |  |  | 5/15 |  |  |
| 100 | 15/15 |  |  |  |  |  |  |
| Controls | 0/30 | 4/35 | 1/30 | 2/30 | 1/30 | 0/30 | 1/30 |

[1] Survivors to total tested on 14th day after infection.
(A) 3-(2-amino-2-methylpropyl)-3-azabicyclo[3.2.2]nonane. 2HCl.
(B) 3-(2-aminoethyl)-3-azabicyclo[3.2.2]nonane. 2HCl.
(C) 3-glycyl-3-azabicyclo[3.2.2]nonane hydrochloride.
(D) 3-(2-methylaminoethyl)-3-azabicyclo[3.2.2]nonane. 2HCl.
(E) 3-(2-aminoethyl)-3-azabicyclo[3.3.1]nonane. 2HCl.
(F) 3-(2-methyl-2-nitropropyl)-3-azabicyclo[3.2.2]nonane.
(G) 3-(2-dimethylaminoethyl)-3-azabicyclo[3.2.2]nonane. 2HCl (three dose oral treatment).

Test procedure 3

Infections were produced in groups of white mice, 16–20 grams body weight, by intranasal instillation of 0.05 ml. volumes of $LD_{95}$ broth dilutions of various influenza types as indicated in Table III. The test compounds indicated in Table III were administered orally in the dosages described in Table III, directly after infection. Results, expressed as mortality rates on the fourteenth day after infection, for infected, non-treated control groups and groups tested with the test compounds are summarized in Table III below:

TABLE III.—ACTIVITY OF TEST COMPOUNDS AGAINST VARIOUS INFLUENZA INFECTIONS IN MICE

| | Influenza virus type | Strain | Survivors/Total[1] | | Activity[2] |
|---|---|---|---|---|---|
| | | | Treated | Control | |
| Compound: | | | | | |
| A | A' | Ann Arbor | 6/15 | 0/15 | Yes. |
| A | A2 | Taiwan | 12/20 | 2/20 | Yes. |
| B | A | PR8 | 15/20 | 4/20 | Yes. |
| B | A | Swine | 13/20 | 2/20 | Yes. |
| B | A' | Ann Arbor | 9/20 | 0/20 | Yes. |
| B | A2 | Taiwan | 15/20 | 2/20 | Yes. |

[1] Survivors to total tested on 14th day after infection.
[2] Statistically significant activity at 5% level using tables by Mainland, D., Herrera L., Sutcliffe, M., Tables For Use With Binomial Samples, Department of Medical Statistics; New York University College of Medicine; 1956.
A 3-(2-amino-2-methylpropyl)-3-azabicyclo[3.2.2]nonane. 2HCl (single oral dose 200 mg./kg.).
B 3-(2-aminoethyl)-3-azabicyclo[3.2.2]nonane. 2HCl (single oral dose 800 mg./kg.).

Test procedure 2

Infections were produced in groups of 5 white mice, 16–20 grams body weight, by intranasal instillation of 0.05 ml. volumes of a $10^{-4.3}$ ($LD_{95}$) broth dilution of influenza A2–J–305–57. Test compounds, as indicated in Table II, were administered orally in the dosages described in Table II (maximum tolerated dose) at 0, 4, and 24 hours after infection. If after fourteen days 2 or more mice from a group of 5 mice were protected, the compound was retested using groups of 10 mice following the same procedure as above; otherwise the compound was rejected as being nonactive. Results, combined from a series of two such tests and expressed as mortality rates on the fourteenth day after infection, for infected, nontreated control groups and groups treated with the The compounds of the present invention described above are dispensed in compositions comprising the active ingredients and excipients including a carrier. While the amount of active ingredient to be given daily will depend on many factors such as the size, age, kind and severity of infection, etc., of the warm-blooded animal, a daily intake ranging from 5 to 500 milligrams per kilogram of body weight will produce good results. The dosage unit may have a total weight varying from 0.05 to 2 g. and may be in a form to be administered one or more times per day, or in smaller forms for multiple daily, or other more frequent administration. Any of the usual dosage unit forms of pharmaceutical compositions can be useful, for example, tablets, hard or soft shell capsules, parenteral solutions or suspensions, oral solutions or syrups, etc.

When dosage units are in the form of tablets they may include, in addition to active ingredient, any of the following excipients: a binder such as acacia, corn starch, gelatin, or the like; a disintegrating agent such as corn starch, potato starch, alginic acid, or the like; a lubricant such as stearic acid, magnesium stearate, talc or the like. Also, a sweetening agent such as saccharin or sucaryl, and/or a flavoring such as peppermint oil, oil of wintergreen, orange or cherry flavoring can be used. Capsules may include, in addition to active ingredient, a lubricant and also an inert filler such as lactose, sucrose, corn starch or the like.

Solutions usually include an acid such as hydrochloric, citric, tartaric, succinic, maleic, ascorbic, phosphoric or the like, or a suitable buffer thereof. Suspensions may include a surfactant such as polyoxyethylene sorbitan monooleate (a complex mixture of polyoxyethylene ethers of mixed partial oleic esters of sorbitol anhydrides); oxyethylated tertiary octylphenol formaldehyde polymer; p-isooctylpolyoxyethylenephenol polymers or the like; a suspending agent such as polyethylene glycol 4000 USP (a condensing polymer of ethylene oxide and water, represented by the formula: $HOCH_2(CH_2OCH_2)nCH_2OH$, wherein $n$ varies from about 70 to 85, the molecular weight being about 4,000); carboxy methylcellulose (sodium carboxymethylcellulose USP, the sodium salt of a carboxymethyl ether of cellulose having a closely controlled number of sodium carboxymethyl ($—CH_2COONa$)

groups introduced into the cellulose molecule to bring about solubility in water); methylcellulose (cellulose methyl ether prepared from wood pulp or chemical cotton by treatment with alkali and methylation of the alkali cellulose with methyl chloride), and the like; and a buffer such as phosphate, citrate, or tartrate. Both solutions and suspensions may include a stabilizer such as disodium salt of ethylenediaminetetraacetic acid, sodium sulfite, monothioglycerol, or the like; and a preservative such as benzyl alcohol, parabens (methyl and propyl esters of p-hydroxybenzoic acid), or the like. Oral solutions may include a suspending agent or viscosity control such as magnesium aluminum silicate, carboxymethylcellulose, or the like, as well as a buffer, preservative, etc. Solutions and suspensions may be of the aqueous sugar or sorbitol type. It is also known in pharmaceutical practice to employ a propyleneglycol type solvent for use with drugs.

Detailed description of the invention

The invention is further illustrated by means of the following examples describing in detail the preparation of representative compounds.

EXAMPLE 1

Preparation of 3-(2-aminoethyl)-3-azabicyclo[3.3.1] nonane dihydrochloride

A solution of 4.42 g. (0.0355 mole) of 3-azabicyclo-[3.3.1]nonane, itself prepared as described by Chem. Abst. 52, 12860i (1958), in 2.90 g. (0.0355 mole) of 70% aqueous glycolonitrile and 20 ml. of ethanol is heated under reflux for 4 hours. The mixture is chilled, the crystalline product is collected by filtration and washed sparingly with cold ethanol: 4.34 g. of 3-azabicyclo[3.3.1] nonane-3-acetonitrile, long rods, melting point 77–79° C., is obtained. [This product may also be obtained in 60% yield, using chloroacetonitrile and sodium carbonate in hot benzene as described by H. Najer, R. Guidicelli and J. Setté, Bull. Soc. Chim. France, 1593 (1962).] Evaporation of the mother liquid and recrystallization of the residue from petroleum ether (boiling point 30–60° C.) gives an additional 1.22 g. of product, melting point 68–77° C. Both product fractions were combined (total yield, 95%) and used in the preparation of the subject compound.

A solution of 5.32 g. (0.033 mole) of 3-azabicyclo-[3.3.1]nonane-3-acetonitrile in 30 ml. of dry ether is added at a fast drip rate to a magnetically stirred suspension of 1.74 g. (0.046 mole) of powdered lithium aluminum hydride in 70 ml. of ether, causing it to reflux. The mixture is heated, refluxed and stirred overnight. After the dropwise addition of 1.74 ml. of water, 1.74 ml. of 15% aqueous sodium hydroxide and 5.22 ml. of water the mixture is stirred until all the gray solids have become white in color. The solids are removed by filtration and the filtrate is evaporated to a residue which is distilled to yield 4.49 g. (82% yield) of an oil, boiling point 89° C./1.6 mm., $n_D^{26}$ 1.4992. (Najer, et al., supra, reported boiling point 94–95° C./5 mm., $n_D^{25}$ 1.4992.) To a solution of 4.16 g. (0.025 mole) of the above oil in 10 ml. of absolute ethanol is added 6.5 ml. of 8 M ethanolic hydrogen chloride. The resulting thick slurry is thinned with 50 ml. of ether. The solids are collected by filtration and washed with ether, yielding 5.72 g. (95% yield), of 3-(2-aminoethyl)-3-azabicyclo[3.3.1]nonane dihydrochloride, melting point 244–246° C.

EXAMPLE 2

Preparation of 3-glycyl-3-azabicyclo[3.2.2]nonane hydrochloride

To a solution of 12.55 g. (0.06 mole) of N-carbobenzoxyglycine and 6.07 g. (0.06 mole) of triethylamine in 80 ml. of dry tetrahydrofuran at about −5° C. is added dropwise with magnetic stirring 8.20 g. (0.06 mole) of isobutylchloroformate. The resulting suspension is stirred for 15 minutes at about −5° C. after which time there is added, dropwise with stirring at about −5° C., a solution of 7.51 g. (0.06 mole) of 3-azabicyclo[3.2.2] nonane in 50 ml. of dry tetrahydrofuran. Stirring is continued and the mixture and the cooling bath are allowed to come to room temperature. The mixture is then evaporated to dryness and the residue is agitated with 100 ml. of ether. The solid is removed by filtration, washed with ether and discarded. The washes and filtrate are combined and evaporated to a viscous residue. To a solution of the residual syrup in 100 ml. of absolute ethanol is added 10 ml. of 8 N ethanolic hydrogen chloride and 1.00 g. of 10% palladium on charcoal catalyst. The system is flushed with nitrogen and then stirred vigorously magnetically under a slow stream of hydrogen gas until the effluent gas stream no longer causes turbidity when directed through a barium hydroxide solution. Filtration of the solution and subsequent evaporation leaves a thick syrup. Crystallization of the syrup from acetone and recrystallization from ethanol ether yields 4.32 g. (33%) of white crystals, melting point 180–199° C.

EXAMPLE 3

Preparation of 3-(2-methyl-2-nitropropyl)-3-azabicyclo-[3.2.2]nonane (A) A solution of 50 g. (0.4 mole) of 3-azabicyclo-[3.2.2]nonane, 35.6 g. (0.4 mole) of 2-nitropropane and 160 ml. of dioxane is cooled to 5° C. and stirred while a solution of 32.4 g. (0.4 mole) of 37% aqueous formaldehyde and 16 ml. of 2 N sodium hydroxide is added dropwise while keeping the temperature within 5–10° C. The mixture is stirred at room temperature for two hours and then heated for one hour on a steam bath. The mixture is cooled in an ice bath and about 200 ml. of water is added slowly. (The mixture is seeded when about 50 ml. of water has been added.) The crude crystalline product is collected, washed several times with cold water and air-dried: yield about 68 g.; melting point 60–65° C. The crude product is recrystallized from 70 ml. of absolute ethanol; yield 51.5 g. (57%); melting point 68–71° C. (This material is satisfactory for use in the preparation of the hydrochloride and in subsequent examples.)

(B) A warm solution of 50 g. (0.4 mole) of 3-azabicyclo[3.2.2]nonane in 120 ml. of dioxane is filtered and to the cooled filtrate is added 48 g. (0.4 mole) of 2-methyl-2-nitro-1-propanol and 27 ml. of 0.25 N sodium hydroxide. This mixture is allowed to stand at room temperature for 3 days and then heated to 70° C. for 1½ hours after which time the mixture is cooled and seeded. About 60 ml. of water is added and the product is collected by filtration: yield 88 g.; melting point 65–68° C. The crude product is recrystallized from 100 ml. of ethanol to yield 78 g. (86%) of purified crystals, melting point 69–71° C.

Preparation of the hydrochloride is carried out by dissolving 0.5 g. of 3-(2-methyl-2-nitropropyl)-3-azabicyclo-[3.2.2]nonane, prepared according to either of the above methods, in 2 ml. of warm 4 N ethanolic hydrogen chloride and cooling the mixture: yield 0.5 g.; melting point 154–158° C. (dec.).

EXAMPLE 4

Preparation of 3-(2-amino-2-methylpropyl)-3-azabicyclo[3.2.2]nonane dihydrochloride A solution of 60 g. (0.266 mole) of 3-(2-methyl-2-nitropropyl)-3-azabicyclo[3.2.2]nonane in 500 ml. of methanol is reduced using 9 g. of Raney nickel catalyst (W–2) at 28° C. and 1,100 pounds of pressure until the hydrogen uptake stops. The catalyst is removed by filtration and the methanol is evaporated on a steam bath at atmospheric pressure. The residue is dissolved in 70 ml. of ethanol and the solution is treated with charcoal and filtered. Ethanolic hydrogen chloride (8 N, 106 ml.) is added to the filtrate and the solution is cooled overnight to give a crystalline product: yield 27 g. (33%); melting point 250–265° C. (dec.). The crude product is recrystallized from 500 ml. of ethanol: yield 21.5 g.; melting point 255–270° C. (dec.);

$\lambda_{max.}^{KBr}$ 4.87, 6.25, and 6.58$\mu$ (—NH$_3^+$)

EXAMPLE 5

Preparation of 3-(2-aminoethyl)-3-azabicyclo[3.2.2]-nonane dihydrochloride

To a stirred solution of 115 g. (0.68 mole) of 3-azabicyclo[3.2.2]nonane-3-ethanol [itself described by V. L. Brown, Jr., and T. E. Stanin, in Ind. Eng. Chem., Product Research and Development, 4, 40 (1965)], in 600 ml. of benzene is added dropwise a solution of 110 g. (0.92 mole) of thionyl chloride in 100 ml. of benzene. The mixture is heated on a steam bath for 3.0 hours, cooled and filtered: yield 93.5 g. (61%) of 3-(2-chloroethyl)-3-azabicyclo [3.2.2]nonane hydrochloride.

A solution of 20.7 g. (93 mmole) of 3-(2-chloroethyl)-3-azabicyclo[3.2.2]nonane hydrochloride and 26 g. (1.5 mole) of ammonia in 200 ml. of 90% ethanol is placed in a one liter flask and allowed to stand at room temperature for five days. The solution is evaporated to dryness under reduced pressure and the residue is dissolved in 20 ml. of water. Sodium hydroxide (10 g.) is added and the mixture is extracted with three 50 ml. portions of benzene. The benzene is dried over potassium carbonate and evaporated to a syrup which is subsequently distilled using a Nester-Faust spinning band colume to give 10.0 g., boiling point 52–43° C./0.03 mm., $n_D^{25}$ 1.5033. This material is dissolved in 100 ml. of absolute ethanol and treated with 12 ml. of concentrated hydrochloric acid to give a crystalline product: yield 12.9 g.; melting point 350° C. (dec.);

$\lambda_{max.}^{KBr}$ 4.85, 6.23, and 6.59$\mu$ (—NH$_3^+$)

EXAMPLE 6

Preparation of 3-(2-dimethylaminoethyl)-3-azabicyclo [3.2.2]nonane hydrochloride A solution of 20.0 g. (89 mmoles) of 3-(2-chloroethyl)-3-azabicyclo[3.2.2]nonane hydrochloride, obtained as described in the first paragraph of Example 5, and 35 g. of methylamine in 200 ml. of 90% ethanol is allowed to stand for 6 days at room temperature. The solution is evaporated to dryness under reduced pressure and the residue is dissolved in 200 ml. of water. Sodium hydroxide (10 g.) is added and the mixture is extracted with three 50 ml. portions of benzene. The benzene is dried over potassium carbonate and evaporated to a syrup which is distilled using a Nester-Faust spinning band column: yield 12.2 g.; boiling point 60–62° C. (0.03 mm.); $n_D^{26}$ 1.4922.

The above material is dissolved in 150 ml. of ethanol and treated with 12 ml. of concentrated hydrochloric acid to give a crystalline solid; yield 13.6 g.; melting point 258–264° C. (dec.). The addition of ether to the filtrate gives an additional 2.4 g. of crystals, melting point 258–264° C. (dec.); total yield is 16.4 g. (70%).

EXAMPLE 7

Preparation of 3-(2-dimethylaminoethyl)-3-azabicyclo [3.2.2]nonane dihydrochloride To a solution of 45.0 g. (1.0 mole) of dimethylamine in 200 ml. of 90% ethanol, kept at less than —10° C., is gradually added 22.4 g. (0.1 mole) of 3-(2-chloroethyl)-3-azabicyclo[3.2.2]nonane hydrochloride, obtained as described in the first paragraph of Example 5. After standing for six days at room temperature, the solution is evaporated to dryness. A solution of the residual solid in 20 ml. of water is chilled during the gradual addition with stirring of 22.4 g. (0.4 mole) of potassium hydroxide. The resulting thick slurry is extracted by decantation with one 100 ml. portion and three 40 ml. portions of ether. The extracts are dried over potassium carbonate, filtered and evaporated. Distillation of the residual oil gives 18.7 g. (97% yield) of the diamine, boiling point 73° C./0.5 mm., $n_D^{25}$ 1.4882.

To a solution of 11.8 g. of the above diamine in 120 ml. of hot, absolute ethanol is added 70 ml. of 2 M ethanolic hydrogen chloride, precipitating 15.8 g. (97% yield) of a white solid, melting point 285° C. (dec.).

EXAMPLE 8

Preparation of 3-(2-aminoethyl)-3-azabicyclo[3.2.1]-octane dihydrochloride

A solution of 7.20 g. (0.065 mole) of 3-azabicyclo-[3.2.1]octane (R. Griot, Helv. Chim. Acta. 42, 67 (1959)) and 5.30 g. (0.065 mole) of 70% aqueous glycolonitrile in 35 ml. of ethanol is heated under reflux for 4 hours. After evaporation of solvent the residue is distilled, affording 8.15 g. (84%) of an oil, boiling point 84–7°/2.6 mm., $n_D^{30}$ 1.4862.

Reduction of 7.51 g. of this aminonitrile with 2.66 g. of lithium aluminum hydride in 130 ml. of ether by the procedure described in Example 1 gives 7.27 g. (94%) of diamine, boiling point 88–9°/6 mm., $n_D^{25}$ 1.4909. Addition of 12.0 ml. of 8 M ethanolic hydrogen chloride to a solution of 7.02 g. of the diamine in 40 ml. of ether and 30 ml. of absolute ethanol deposited 9.82 g. (95%) of glistening leaflets, melting point ca. 276–283° C. (dec.).

EXAMPLE 9

| Hard gelatin capsules: | Gm. |
|---|---|
| 3 - (2 - amino - 2 - methylpropyl)-3-azabicyclo[3.2.2]nonane dihydrochloride | 400 |
| Cornstarch | 300 |
| Magnesium stearate, powder | 100 |
| Talc | 100 |

The powdered ingredients are mixed thoroughly and then encapsulated in 2,000 two-piece hard gelatin capsules each containing 200 mg. of 3-(2-amino-2-methylpropyl-3-azabicyclo[3.2.2]nonane dihydrochloride.

EXAMPLE 10

Tablets:                                                                    Gm.
```
3-(2 - aminoethyl) - 3 - azabicyclo[3.2.2]nonane-
    dihydrochloride _____ 50
Lactose _____ 25
Starch _____ 25
Calcium stearate _____ 5
Talc _____ 5
```

The finely powdered ingredients are mixed thoroughly and compressed into 1000 tablets each containing 50 mg. of 3-(2-aminoethyl)-3-azabicyclo[3.2.2]nonane dihydrochloride.

EXAMPLE 11

Soft gelatin capsules

One-piece soft gelatin capsules for oral use each containing 100 mg. of 3-(2-aminoethyl)-3-azabicyclo[3.3.1]-nonane are prepared by first dispersing the compound in sufficient corn oil to render the material capsulatable and then encapsulating in the usual manner.

We claim:
1. A method of treating influenza viral infections selected from the group consisting of types A, A' and A2 strains, Ann Arbor, Taiwan, PR8 and swine in warm-blooded animals which comprises orally administering to said animals so infected an antiinfluenza viral effective amount of a cyclo compound of the formula:

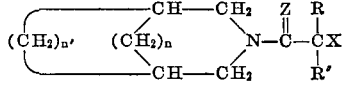

wherein R and R' are selected from the group consisting of hydrogen and lower alkyl; Z is selected from the group consisting of two hydrogen atoms and oxygen; X is selected from the group consisting of amino, loweralkylamino, diloweralkylamino and nitro; $n$ is an integer of 1 to 2; $n'$ is an integer of 2 to 3, and a physiologically acceptable salt thereof.

2. A method according to claim 1, wherein the bicyclo compound is 3-(2-amino-2-methylpropyl) - 3 - azabicyclo-[3.2.2]nonane.

3. A method according to claim 1, wherein the bicyclo compound is 3 - (2 - aminoethyl) - 3 - azabicyclo[3.2.2]-nonane.

4. A method according to claim 1, wherein the bicyclo compound is 3 - (2 - aminoethyl) - 3 - azabicyclo[3.3.1]-nonane.

5. A method according to claim 1, wherein the bicyclo compound is 3-glycyl-3-azabicyclo[3.2.2]nonane.

6. A method according to claim 1, wherein the bicyclo compound is 3-(2-methylaminoethyl)-3-azabicyclo[3.2.2]-nonane.

7. A method according to claim 1, wherein the bicyclo compound is 3 - (2 - methyl-2-nitropropyl)-3-azabicyclo-[3.2.2]nonane.

8. A method according to claim 1, wherein the bicyclo compound is 3 - (2 - dimethylaminoethyl) - 3 - azabicyclo-[3.2.2]nonane.

References Cited

FOREIGN PATENTS 608,905    2/1965    Belgium.

OTHER REFERENCES

Chemical Abstracts, 58: 6714a (1963).

ALBERT T. MEYERS, Primary Examiner

J. D. GOLDBERG, Assistant Examiner

U.S. Cl. X.R.

424—244